United States Patent [19]

Needleman et al.

[11] Patent Number: 4,979,388

[45] Date of Patent: Dec. 25, 1990

[54] ELECTRONIC SHOCK ABSORBER TESTING INSTRUMENT

[76] Inventors: Nathan Needleman, Bachemer Str. 27, 5300 Bonn 2; Helga Crummenauer, Lessingstrasse 19, 6501 Ober-Olm, both of Fed. Rep. of Germany

[21] Appl. No.: 386,983

[22] Filed: Jul. 31, 1989

[30] Foreign Application Priority Data

Aug. 16, 1988 [DE] Fed. Rep. of Germany ... 8810344[U]

[51] Int. Cl.[5] .............................................. G01M 7/04
[52] U.S. Cl. .......................................................... 73/11
[58] Field of Search ....................................... 73/11, 669

[56] References Cited

U.S. PATENT DOCUMENTS 3,830,093  8/1974  Emerson .................................. 73/11
4,376,387  3/1983  Stevens et al. ......................... 73/11
4,703,648 11/1987  Hudacsek et al. ..................... 73/11

Primary Examiner—Donald O. Woodiel
Attorney, Agent, or Firm—Staas & Halsey

[57] ABSTRACT

A shock absorber testing instrument with electronic units for recording vibrating movements of the vehicle body and for signal processing and assessment, including at least one sensor, preferably a piezo-sensor or a micro-sensor for signal processing and assessment of the data collected. The instrument also includes at least one measured value amplifier and a microprocessor, as well as a keyboard, a display unit and several suitable interfaces to connect other peripheral devices, which preferably are integrated in the instrument.

7 Claims, 5 Drawing Sheets

ELECTRONIC SHOCK ABSORBER TESTING INSTRUMENT

BACKGROUND OF THE INVENTION

The invention deals with shook absorber testing instruments with electronic units that record vibrating movements of a vehicle body, perform signal processing and assess the recorded data.

Shock absorbers in vehicles cushion accelerated masses which are brought about from the release of tension in springs, so that accelerations are absorbed. It is therefore necessary to test the functional safety of such chock absorbers. There are numerous shock absorber testing instruments which record the vibration of a vehicle on so-called test stands. The conventional instruments are, however, designed in a very costly manner; and are as a result, very expensive. In addition, the customary test instruments are characterized by the fact that they are impractical and complicated to operate. The measured values are often inaccurate and difficult to classify and evaluate.

SUMMARY OF THE INVENTION

An object of the invention is to provide a testing instrument that allows a user to identify the data gathered in the simplest manner possible and to print it out if necessary. Any errors which are caused during measurement are compensated for by the instrument in accordance with the invention without losing any previous measuring data in the process.

A further object of the invention is to provide a testing instrument that is handy, robust and has an independent power supply.

To achieve the above and other objects, shock absorber testing instrument of the invention includes electronic units for recording vibrating movements of a vehicle body and for signal processing and at least one sensor, preferably a piezo-sensor or a micro-sensor for signal processing and assessment of the data collected, and at least one measured value amplifier and a microprocessor, as well as a keyboard, a display unit and interfaces to connect other peripheral devices.

A preferred embodiment of the invention includes: a display unit that displays a schematic diagram of an automobile with a measured value indicator located at four corner points of the schematic diagram and separate measured value indicators; a keyboard with at least five keys used for inputting commands; power comprising either battery or an accumulator; a memory unit located within the testing instrument; a micro-sensor; a piezosensor; an integrated printer; and a housing that has an inlet and an outlet for the printer control tape.

The present invention will be explained in more detail on the basis of the enclosed drawings, which show a special preferred design example of the invention.

DESCRIPTION OF THE PREFERRED EMBODIMENTS

Figure 1:
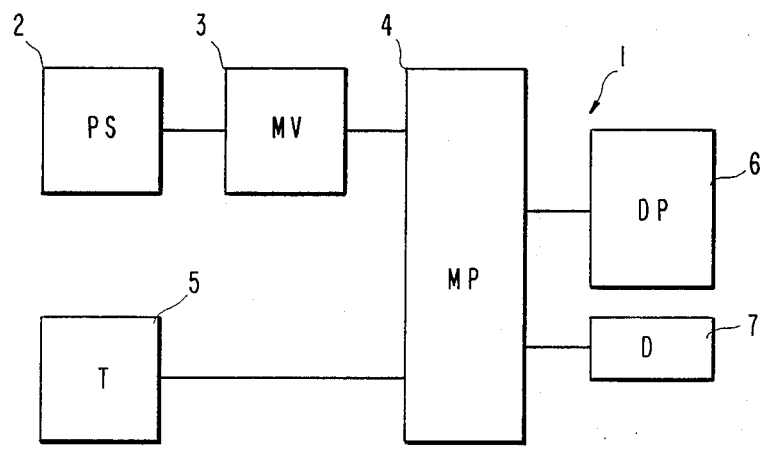
FIG. 1 is a schematic diagram of testing instrument in accordance with the invention.

FIG. 1 is a schematic diagram of shock absorber testing instrument 1 in accordance with the invention.

Figure 2:
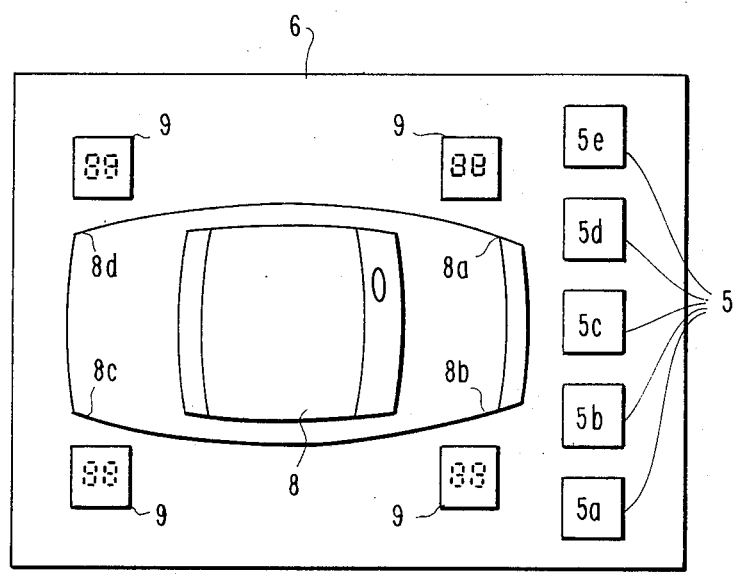
FIG. 2 is a schematic diagram of a display unit in accordance with the invention.
Figure 3:
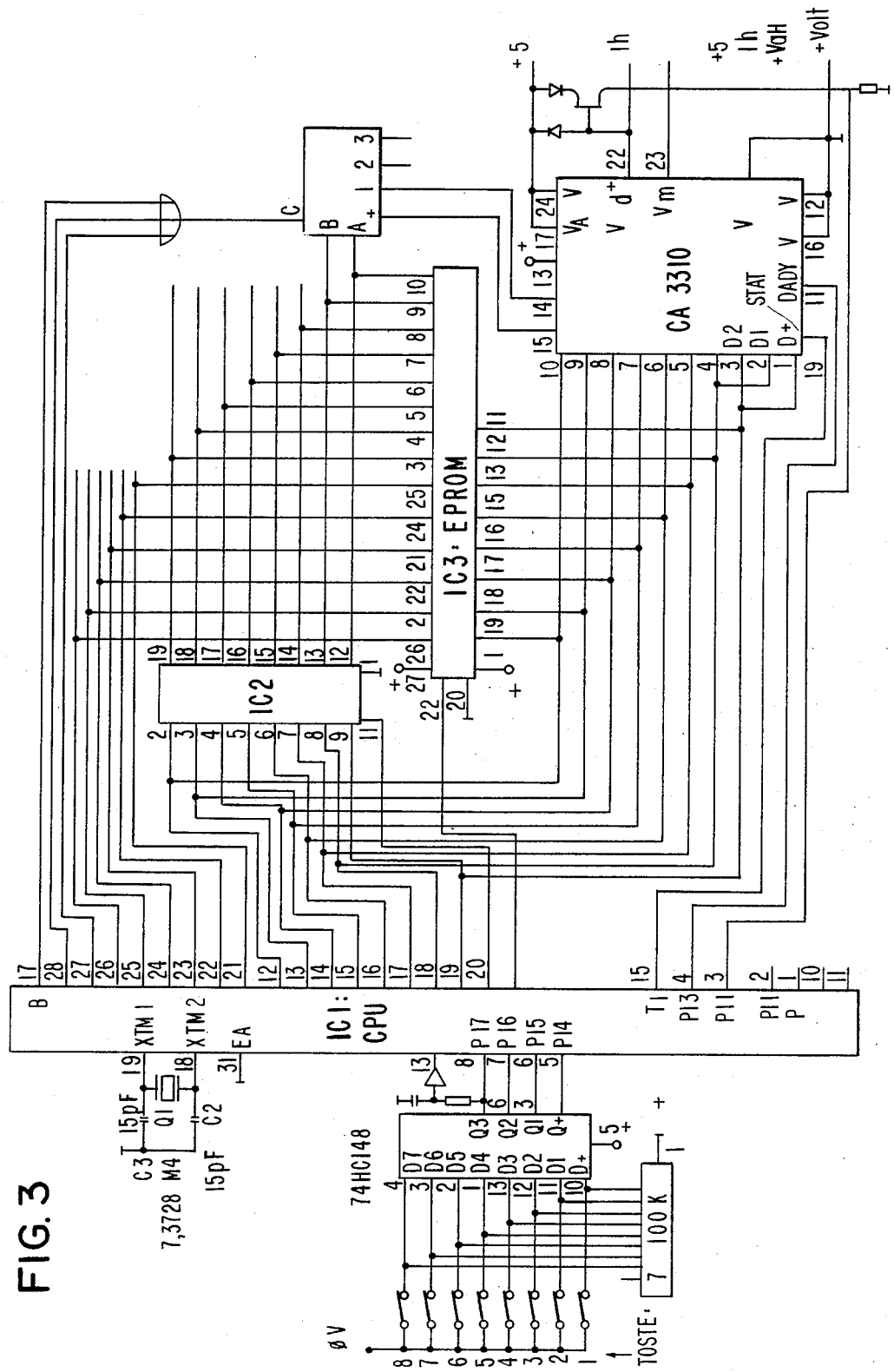
FIG. 3 is a schematic diagram of a testing instrument in accordance with the invention.
Figure 5:
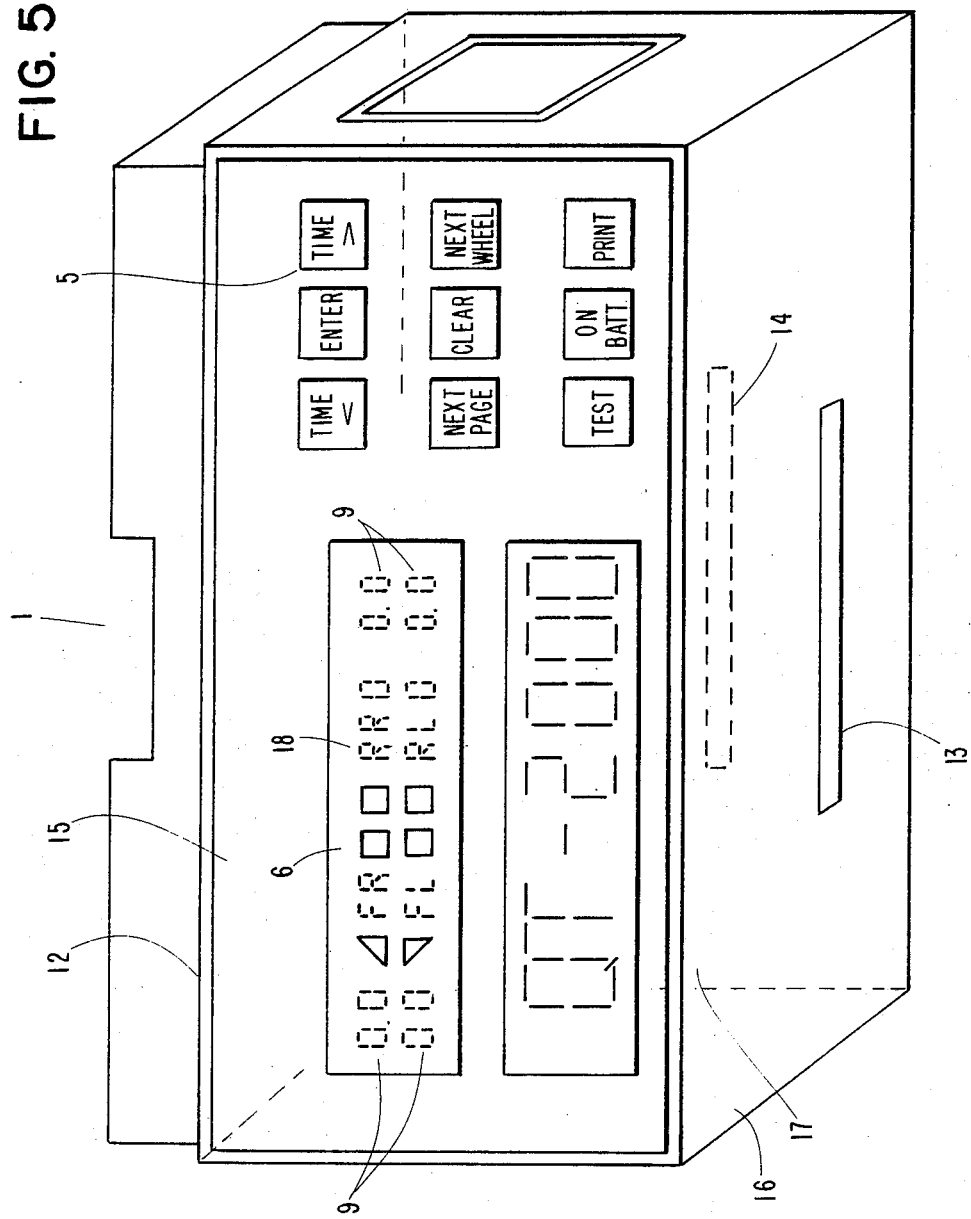
FIG. 5 is a perspective view of a testing instrument in accordance with the invention.

In accordance with the invention also the elements used are partially or even completely encapsulated in a housing 12 (FIG. 5). A sensor 2, which in this design example a piezo-sensor, records the vibrating movement of a vehicle body which is located on a test stand. A measured value amplifier 3 and a microprocessor 4 perform signal processing and assessment of the data gathered. Commands are input via a keyboard 5 and the evaluated measured data can be viewed on a display unit 6. Other peripheral devices 7, such as a printer, can be connected via interfaces. FIG. 2 is a schematic diagram of a display unit 6, and FIG. 3 is a schematic diagram of testing instrument in accordance with the invention. The functioning of the testing instrument is explained with reference to FIGS. 2 and 3. A key 5a ("on/next") is used to turn the instrument on. To make the process easier, the display unit 6 includes schematic diagram 8 of a vehicle body with measured value indicators 9 located at four corner points 8a through 8d. The last measured value is displayed when key 5a ("on/next") is activated. A blinking decimal point marks the measuring point which has been selected for the next measurement.

When the key 5a ("on/next") is pressed again, a next measuring point is selected. If no key is pressed for 50 seconds, the instrument will switch off automatically without losing any data. A key 5e ("clear") deletes all measured values in memory, sets all measured value indicators 9 to "00" and selects the measuring point of the vehicle body as viewed from the front left. A key 5b ("test") is used to measure the selected measuring point. Mechanical vibrations to the vehicle body, which are caused by shocks are measured, evaluated, and finally displayed on a 7-segment display.

The measuring procedure can be repeated as many times as desired. The condition of the shock absorber can be determined from an assessment table. A key 5d ("print") serves to print out the results of the measurement via a serial interface. This option is used to document all service work. A key 5c ("page") serves to store in memory up to four measuring series. This key is pressed to switch to the next page, which can again accept the measured values of four shock absorbers. The page number (1 through 4) is shown on the display while the key is pressed. The instrument switches back to page 1 after page 4 and displays the previous measurement data.

In a preferred embodiment, the instrument is powered by a 9 volt battery or a 9 volt accumulator, and the display is preferably a liquid crystal display. When the battery power falls below an acceptable value, this is indicated by blinking of three decimal points at the measuring points which are not presently selected. When the battery must be changed, the measured values in memory are deleted with key 5e ("clear").

The measurements are displayed from 1 to 4, for example, from front left to rear left. Every measurement which takes place is stored in memory and remains in the display until it is cleared by pressing a special key. If a measurement has apparently been carried out improperly due to lack of human attention, a key can be pressed to clear the measurement just carried out so it can be repeated correctly. The other measurements remain in memory. Finally, the test personnel can read out all four measurements from the display unit. Even when the measurements are automatically cleared after a certain period of time, these can be immediately retrieved on the following day by pressing a button (memory) and a reading can be taken.

Figure 4:
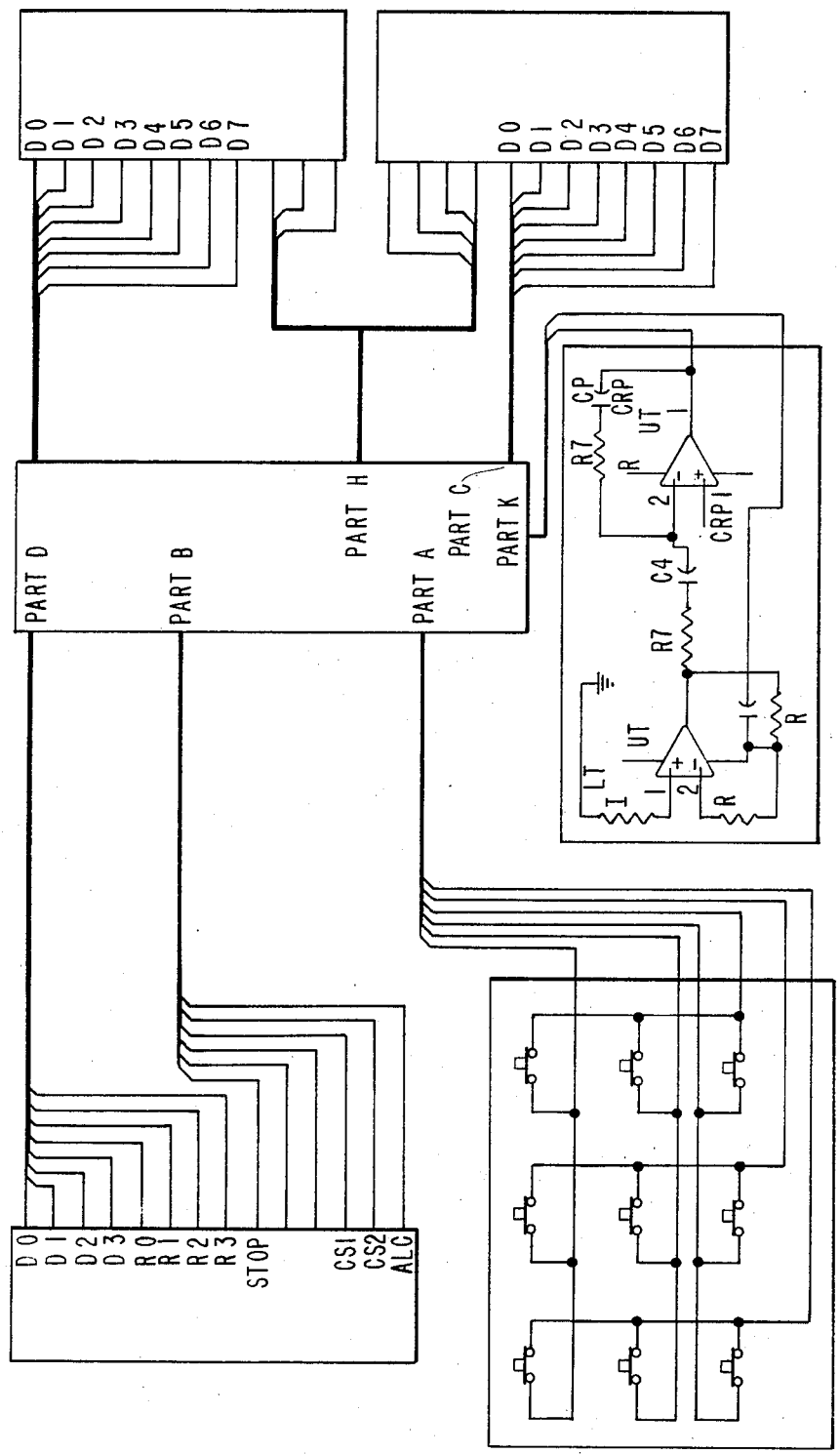
FIG. 4 is a schematic diagram of another embodimeht of a testing instrument in accordance with the invention.
Figure 6:
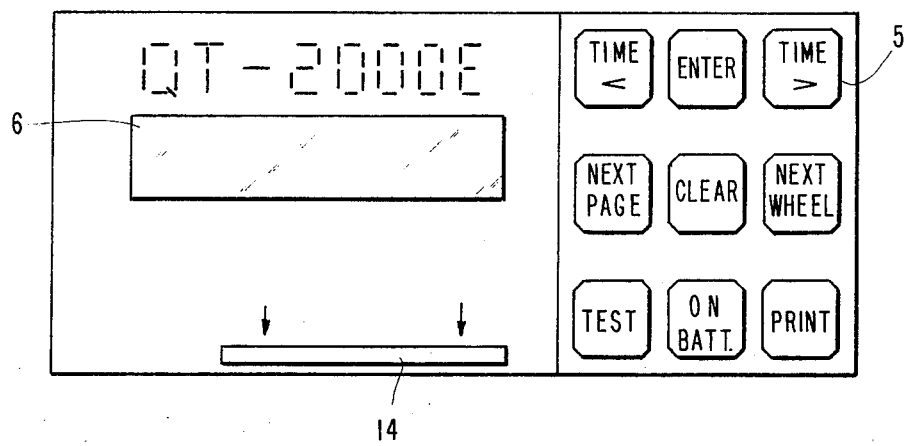
FIG. 6 is a schematic diagram of a keyboard in accordance with the invention.

FIG. 4 is a schematic diagram of another embodiment of the shock absorber testing instrument 1 in accordance with the invention. FIG. 5 is a perspective view of a testing instrument 1 in accordance with the invention. As shown in FIG. 5, the shock absorber testing instrument 1 includes a housing 12. A printer is integrated into this instrument. If the display unit is considered as being on a top surface 15, side wall 16 includes an outlet 13 and a bottom area 17 includes an inlet 14 for the printer control tape. Alternatively, the printer control tape inlet 14 can be located in the area of the display, as shown in FIG. 6.

The function of this design example is explained in more detail in connection with FIGS. 5 and 6. The instrument is activated by pressing the "ON/Batt." key. A bar will be visible on the display unit for approximately three seconds. The length of the bar indicates battery power. Afterwards, the display switches to the main display image. By pressing this key once more, the information regarding battery power can be displayed once again. The system automatically shuts off if no key is pressed for 30 seconds. Time and date information can be input by using the "Time >", and "Time <" and "Enter" keys. After pressing the "Time >" or "Time <" key, the display will show, for example, the following:

Time

19:27

The first digit blinks. If the key is pressed again, the first digit increases. The "Time <" key is pressed to decrease the digit. The "Clear" key is pressed to clear all digits. As soon as the correct value is display, pressing the "Enter" key enters the data. The value is stored in memory and the next digit will blink. After the fourth digit has been entered, the display will shift and display, for example, the following:

Date
09.14.1987

Setting the date takes place in the same manner as setting the time. After the last digit has been entered, the main display image will be shown. Information about the current page (auto) is shown by pressing the "Next Page" key. The display will look like the following example:

Page 3
KL-U-5688

The page number increases by repeatedly pressing this key. The "Time >" and "Time <" keys are used, as in the previous example, to input the vehicle number or other identifying information. The numerical digits are displayed first and then the letters. The "clear" key is pressed to delete all symbols on this page. The main display image reappears after data has been input for all positions.

By pressing the "Next Wheel" key, the current shock absorber changes on the main display image of the display unit. If the "Clear" key is pressed while the main display image is displayed, the following will be displayed:

Press "Clear"
for all clear the "Enter" key is used to return to the main display image. If no key is pressed for 30 seconds or more, the instrument will shut off automatically.

The current page (auto) is shown on the display by pressing the "Test" key. This allows the possibility of testing whether or not the correct automobile and the correct shock absorber have been selected. It is also possible to alter data on the display. If the key is pressed for a second time, the actual test procedure will be activated. In order to do so, a powerful downward thrust must cause the automobile to vibrate and effect movement of the corresponding shock absorber. If the thrust is not powerful enough, no test is carried out. Only when a certain force is reached will the instrument react automatically and display a two-digit numerical value for this shock absorber in the main display image. The next shock absorber to be tested will blink on the display and so on.

The "Print" key must be pressed to obtain a printout of the values for a certain automobile. As was previously the case with the "Test" key, the information on the current page will be shown on the display. If this is not the correct information, the "Page" key is pressed until the desired page appears. It is also still possible to alter data on the display. Pressing the "Print" key a second time activates the printing process. Upon completion of the print process, the main display image will be shown. Reference character 9 on the display shows the measured value indicator. Reference character 18 shows the side display, as well as the shock absorber data.

The electronic shock absorber testing instrument in accordance with the invention represents an apparatus which is simply designed and inexpensive to manufacture. It delivers the greatest possible accuracy in measuring results and is also easy to operate.

We claim:

1. A test instrument for testing shock absorbers on a vehicle comprising:
   a sensor connectable to one of the shock absorbers of the vehicle;
   a measured value amplifier operatively connected to said sensor;
   a display;
   a keyboard;
   processing means for receiving signals from said measured value amplifier, for storing data representative of said received signals, for displaying said stored data on said display in response to operation of said keyboard; and
   interface means for interfacing a peripheral with said processor means.

2. A test instrument according to claim 1, further comprising:
   additional sensors respectively connectable to other shock absorbers of the vehicle;

additional measured value amplifiers respectively connected to said additional sensors, and wherein said processor means includes means for receiving signals from said additional measured value amplifiers.

3. A test instrument according to claim 2, wherein said processor means further comprises means for displaying a schematic of the vehicle and respective measured value indicators identifying a sensor associated with data currently being stored.

4. A test instrument according to claim 3, wherein said sensor comprises a micro-sensor.

5. A test instrument according to claim 3, wherein said sensor comprises a piezo-sensor.

6. A test instrument according to claim 3, further comprising:
   printer means for printing said stored data in response to operation of said keyboard.

7. A test instrument according to claim 6, further comprising:
   a housing enclosing said measured value amplifier, said additional measured value amplifiers, said display and said processor means, and having mounted thereon said keyboard.

* * * * *